United States Patent [19]

Hoene et al.

[11] 4,172,102

[45] Oct. 23, 1979

[54] LOW-SHRINK UNSATURATED POLYESTER MOLDING COMPOSITIONS

[75] Inventors: Richard Hoene, Heidelberg; Anton Hesse, Luetzelsachsen; Kurt Demmler, Ludwigshafen; Horst Lawonn, Limburgerhof, all of Fed. Rep. of Germany

[73] Assignee: BASF Aktiengesellschaft, Fed. Rep. of Germany

[21] Appl. No.: 855,871

[22] Filed: Nov. 30, 1977

[30] Foreign Application Priority Data

Dec. 21, 1976 [DE] Fed. Rep. of Germany ....... 2657808

[51] Int. Cl.² .................... C08L 67/06; C08L 75/06
[52] U.S. Cl. ........................... 525/74; 525/80
[58] Field of Search ............... 260/862, 876 R, 881, 260/885, 886, 898, 901

[56] References Cited

U.S. PATENT DOCUMENTS

| | | | |
|---|---|---|---|
| 3,104,575 | 9/1963 | Robinson | 83/168 |
| 3,642,672 | 2/1972 | Kroekel | 260/16 |
| 3,701,748 | 10/1972 | Kroekel | 260/40 |
| 3,718,714 | 2/1973 | Comstock et al. | 260/862 |
| 3,772,241 | 11/1973 | Kroekel | 260/40 |
| 3,836,600 | 9/1974 | Brewbaker et al. | 260/836 |
| 3,883,612 | 5/1975 | Pratt | 260/862 |
| 3,947,422 | 3/1976 | Tatum et al. | 260/42.52 |
| 3,997,627 | 12/1976 | Ichimura et al. | 260/862 |
| 3,998,909 | 12/1976 | Roberts et al. | 260/862 |
| 4,009,225 | 2/1977 | Maxel | 260/862 |
| 4,048,257 | 9/1977 | Stevenson | 260/862 |
| 4,051,085 | 9/1977 | Hess et al. | 260/862 X |

FOREIGN PATENT DOCUMENTS 1201088  8/1970  United Kingdom ............ 260/860

*Primary Examiner*—Thomas DeBenedictis
*Attorney, Agent, or Firm*—Keil & Witherspoon

[57] ABSTRACT

Unsaturated polyester molding compositions which contain ethylenically unsaturated polyesters, copolymerizable ethylenically unsaturated monomeric compounds and a polyalkylene ether copolymer have improved shelf life, can be cured with little shrinkage and after curing give a smooth surface with high gloss.

16 Claims, No Drawings

LOW-SHRINK UNSATURATED POLYESTER MOLDING COMPOSITIONS

The present invention relates to unsaturated polyester molding compositions which can be cured with little shrinkage, which compositions contain ethylenically unsaturated polyesters, copolymerizable ethylenically unsaturated monomeric compounds and a polyalkylene ether copolymer, exhibit improved shelf life and after curing give a smooth surface with high gloss, and to a process for their manufacture.

Unsaturated polyester molding compositions are employed for the manufacture of articles which may or may not be reinforced with fibers, e.g. glass, asbestos or textile fibers, and are used extensively for the manufacture of such products as automotive bodywork components, furniture, e.g. chairs, bases for electric radiators, shells and the like. Compared to metals, such products are distinguished, inter alia, by light weight, great strength in relation to their weight, resistance to corrosion, and flexibility in design of the articles to be produced. A major disadvantage of the conventional products is that they have a rough, wavy surface with the characteristic pattern of the reinforcing fibers. These rough surfaces are at least partially attributable to the shrinkage occurring on polymerization of the resin. Though this is presumably not the only reason for the low degree of surface smoothness of the moldings, it is nevertheless regarded as a predominant factor.

For many applications, the surface smoothness of the fiber-reinforced resin laminates is immaterial. However, for certain purposes—if no after-treatment is carried out or if only a thin surface coating is applied, which is unable to even out the surface roughness—the mostly rough surface is unsatisfactory; for example, this is the case with exposed automotive components. Processes of limited applicability have been disclosed for improving the surface smoothness of moldings reinforced with glass fibers; these include the use of gel coatings of higher resin content, or of gauze-like glass fiber surface mats. In both cases, a resin-rich surface is obtained, into which the glass fiber rovings are immersed, so that the latter are less visible. However, these procedures entail additional treatment steps, and additional cost.

It is frequently desirable to provide moldings with a surface coating which imparts a smooth, metal-like, very glossy appearance. In practice, this is done by a dry polishing process which improves the surface smoothness of the glass fiber-reinforced plastic article before the final surface coating is applied; this polishing process is time-consuming and requires additional labor. Such a process is currently used for improving the surface in the manufacture of automotive bodywork from glass fiber-reinforced polyester. In such a case, the costs of the dry polishing process are a substantial factor in the total costs of finishing of the bodywork.

Processes have already been disclosed for reducing or entirely eliminating the shrinkage on curing of unsaturated polyester resins, by adding solutions of thermoplastics in vinyl monomers to polyester molding compositions containing fillers and glass fiber reinforcement; in such cases, a continuous phase of an essentially crosslinked unsaturated polyester resin, and an opaque phase containing the thermoplastic polymer and dispersed in the continuous phase, are formed.

It is possible in this context to distinguish between one-component and two-component systems. In the one-component system the thermoplastic is either dissolved or emulsified in the unsaturated polyester resin. In both cases, a disperse phase is formed during or before curing. In the case of a two-component system, the incompatibility between the unsaturated polyester resin phase and the thermoplastic phase already exists before curing; such is the case, for example, with polymers or copolymers of styrene or of its derivatives. Since, unlike the clear one-component systems, these systems can be pigmented successfully, they are used frequently in spite of having certain disadvantages. It is true that a disadvantage encountered is that the monomer-containing thermoplastic phase separates out prematurely (due to the particles increasing in size) as soon as the system is no longer stirred. This phenomenon manifests itself particularly if low-viscosity mixtures containing little or no filler are stored for several hours or even days before they are processed.

This leads to a non-uniform phase distribution in the molding and hence to non-reproducible results after processing. Similar remarks apply to unsaturated polyester resin mixtures of the same type which, however, contain fillers and glass fibers and which are processed by a wet lay-up method, i.e. without prior thickening with alkaline earth metal oxides. The longer the molding compositions have been stored, the poorer is the surface of the moldings.

In the case of glass mats (prepregs) produced from molding compositions, based on unsaturated polyester resins, which have been thickened with alkaline earth metal oxides and contain fillers and glass fiber reinforcement, this effect causes the mat to be very tacky, thereby making the mat difficult to handle and also making it difficult to pull off the covering film cleanly.

Further, U.S. Pat. No. 3,836,600 discloses curable resin mixtures, for example comprising (a) an unsaturated polyester resin, a terminally unsaturated vinyl ester resin or a mixture of these, (b) one or more monomers copolymerizable therewith and (c) a polymeric low profile additive, which mixtures contain, as a stabilizer, an anionically polymerized block copolymer of the formulae Bx-Ay and Ay-Bx-Ay (where B is a monoalkenyl-aromatic monomer, a conjugated diene monomer or a mixture of these, polymerized to form a block segment, A is a polymerized ethylene oxide unit and x and y each have a value of not less than 25), in amounts of from 0.1 to 5% by weight, based on components (a) and (b). The linear block copolymers manufactured by anionic polymerization from "living" polystyrene and ethylene oxide have the disadvantage that they can only be produced from a limited number of monomers, which do not contain any hydrogen atoms which are active in a Zerewitinoff reaction, namely monoalkenyl-aromatic monomers and conjugated diene monomers, and that the improvement in stability achievable by means of the block copolymers is dependent on the presence of quite specific polymeric low profile additives. Using the above linear block copolymer stabilizers, it is only possible to stabilize unsaturated resin mixtures in which the low profile additives are thermoplastics which are obtained by polymerizing alkenyl-aromatic monomers, i.e. polyalkenyl-aromatic thermoplastics, and/or polymerizing conjugated dienes, i.e. polydiene rubbers.

It is an object of the present invention to provide unsaturated polyester molding compositions which can be cured in the presence of conventional polymerization initiators, cure with little shrinkage and give moldings which have a smooth surface and improved gloss.

We have found that this object is achieved by providing unsaturated polyester molding compositions which are curable in the presence of conventional polymerization initiators and which contain a mixture of (a) one or more ethylenically unsaturated copolymerizable polyesters, (b) one or more ethylenically unsaturated copolymerizable monomeric compounds and (c) a polyalkylene ether copolymer, with or without (d) thickeners, inhibitors, fillers, lubricants, reinforcing agents, inert solvents, polymerization accelerators, shrinkage-reducing additives and/or other auxiliaries conventionally used with polyester molding compositions, the polyalkylene ether copolymer being a graft polymer and/or copolymer mixture which is obtained by free radical polymerization of ethylenically unsaturated polyalkylene ethers with one or more ethylenically unsaturated monomers.

Graft polymer and/or copolymer mixtures, for the purposes of the invention, are mixtures which comprise the following components:

(i) unmodified ethylenically unsaturated polyalkylene ether (ii) graft polymer and/or copolymer and (iii) pure homopolymer, or homopolymer and copolymer, obtained by polymerization of the ethylenically unsaturated monomers.

Using the curable unsaturated polyester molding compositions according to the invention, it is possible to manufacture cured fiber-reinforced plastic moldings which have a smooth surface, without it being necessary to invoke the additional processes, described above, for smoothing the surface. Furthermore we have found, surprisingly, that the polyester molding compositions according to the invention give emulsions which are extremely stable on storage; for example, they do not suffer phase separation after 24 hours' storage at room temperature.

The curable, unsaturated polyester molding compositions are manufactured from (a) one or more ethylenically unsaturated copolymerizable polyesters, (b) one or more ethylenically unsaturated copolymerizable monomeric compounds and (c) a polyalkylene ether copolymer, with or without (d) thickeners, inhibitors, fillers, lubricants, reinforcing agents, inert solvents, polymerization accelerators, shrinkage-reducing additives and/or other auxiliaries conventionally used with polyester molding compositions, by adding from 0.1 to 25 parts by weight of the polyalkylene ether copolymer to 100 parts by weight of a mixture of components (a) and (b), the polyalkylene ether copolymer being a graft polymer and/or copolymer mixture which is obtained by free radical polymerization of ethylenically unsaturated polyalkylene ethers with one or more ethylenically unsaturated monomers.

The following should be noted with respect to the starting components (a) to (d) used for the manufacture of the curable unsaturated polyester molding compositions:

(a) Suitable unsaturated polyesters are the conventional polycondensation products of polybasic, especially dibasic, carboxylic acids and their esterifiable derivatives, especially their anhydrides, linked, by ester bonds, to polyhydric, especially dihydric, alcohols; these polycondensation products may or may not additionally contain radicals of monobasic carboxylic acids and/or radicals of monohydric alcohols and/or radicals of hydroxycarboxylic acids. At least some of the radicals must contain ethylenically unsaturated copolymerizable groups.

Suitable polyhydric, especially dihydric, saturated or unsaturated alcohols are the conventional alkanediols and oxaalkanediols, which in particular contain acyclic groups, cyclic groups or both types of groups, e.g. ethylene glycol, propane-1,2-diol, propane-1,3-diol, butane-1,3-diol, butane-1,4-diol, hexane-1,6-diol, 2,2-dimethylpropane-1,3-diol, diethylene glycol, triethylene glycol, polyethylene glycol, cyclohexane-1,2-diol, 2,2-bis-(p-hydroxycyclohexyl)-propane, trimethylolpropane monoallyl ether or butene-1,4-diol. Minor amounts of monohydric, trihydric or polyhydric alcohols, e.g. ethylhexanol, fatty alcohols, benzyl alcohols, 1,2-di-(allyloxy)-propan-3-ol, glycerol, pentaerythritol or trimethylolpropane can also be used. The polyhydric, especially dihydric, alcohols are in general reacted in stoichiometric, or near-stoichiometric, amount with the polybasic, especially dibasic, carboxylic acids or their condensable derivatives.

Suitable carboxylic acids and their derivatives are dibasic olefinically unsaturated, preferably $\alpha,\beta$-olefinically unsaturated carboxylic acids, e.g. maleic acid, fumaric acid, chloromaleic acid, itaconic acid, citraconic acid, methyleneglutaric acid and mesaconic acid, and their esters and, preferably, their anhydrides. The polyesters may furthermore contain, as co-condensed units, other dibasic, unsaturated and/or saturated or aromatic carboxylic acids or their derivatives which act as modifiers, e.g. succinic acid, glutaric acid, $\alpha$-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, as well as monobasic, tribasic and polybasic carboxylic acids, e.g. ethylhexanoic acid, fatty acids, methacrylic acid, propionic acid, benzoic acid, 1,2,4-benzenetricarboxylic acid or 1,2,4,5-benzenetetracarboxylic acid. The use of maleic acid, maleic anhydride and fumaric acid is preferred. Since the maximum cross-linkability of such polyesters is of great importance in determining the performance of the low-shrinkage system, the greater part, i.e. from 50 to 100%, of the dicarboxylic acids present in the polyesters should be unsaturated.

Mixtures of unsaturated polyesters, including those which are of limited solubility in the vinyl monomers (b) and crystallize readily, can also be employed advantageously. Such unsaturated polyesters which crystallize readily may be synthesized from, for example, fumaric acid, adipic acid, terephthalic acid, ethylene glycol, butane-1,4-diol, hexane-1,6-diol and neopentylglycol.

The unsaturated polyesters have acid numbers of from 10 to 200, preferably from 20 to 85, and mean molecular weights of from about 800 to 6,000, preferably from about 1,000 to 4,000.

The amorphous unsaturated polyesters and the potentially crystallizable unsaturated polyesters are in general manufactured from their starting components by melt condensation, or by condensation under azeotropic conditions, either continuously or batchwise.

Regarding the compositions of unsaturated polyesters, reference may also be made, for example, to the book by H. V. Boenig, Unsaturated Polyesters: Structure and Properties, Amsterdam, 1964. The curable unsaturated polyester molding compositions according to the invention in general contain from 80 to 30, preferably from 70 to 50, % by weight of unsaturated polyesters, based on the total weight of components (a) and (b).

(b) Suitable copolymerizable, ethylenically unsaturated monomeric compounds are the allyl compounds and, preferably, the vinyl compounds, which are conventionally used for the manufacture of unsaturated polyester molding compositions, for example styrene, substituted styrenes, e.g. p-chlorostyrene or vinyltoluene, esters of acrylic acid and methacrylic acid with alcohols of 1 to 13 carbon atoms, e.g. methyl methacrylate, butyl acrylate, ethylhexyl acrylate, hydroxypropyl acrylate, dihydrodicyclopentadienyl acrylate and butanediol diacrylate, acrylamides and methacrylamides, allyl esters, e.g. diallyl phthalate, and vinyl esters, e.g. vinyl ethylhexanoate, vinyl pivalate and the like. Mixtures of the above olefinically unsaturated monomers can also be used. Preferred components (b) are styrene, α-methylstyrene, chlorostyrene, vinyltoluene, divinylbenzene and diallyl phthalate. The content of component (b) in the polyester molding compositions is in general from 20 to 70% by weight, preferably from 30 to 50% by weight, based on the total weight of components (a) and (b).

(c) Suitable polyalkylene ether copolymers are graft polymer and/or copolymer mixtures which are obtained by free radical polymerization of ethylenically unsaturated polyalkylene ethers with one or more ethylenically unsaturated monomers. The polyalkylene ether copolymers which may be used according to the invention, and which have mean molecular weights of from about 1,000 to 1,000,000, preferably from about 3,000 to 100,000, are incorporated into the polyester molding composition in such amount that the latter contains from about 0.1 to 25% by weight, preferably from 10 to 20% by weight, based on the total weight of the components (a) and (b), of the polyalkylene ether copolymers (c).

Ethylenically unsaturated polyalkylene ethers with molecular weights of from 500 to 20,000, preferably from 2,000 to 10,000, are used as one of the starting components for the manufacture of the polyalkylene ether copolymers.

Saturated hydroxyl-containing polyalkylene ethers can be obtained, for example, by reacting one or more alkylene oxides, where alkylene is of 2 to 4 carbon atoms, with a starter molecule which contains several active hydrogen atoms. Examples of suitable alkylene oxides are ethylene oxide, 1,2-propylene oxide, 1,3-propylene oxide, epichlorohydrin, 1,2-butylene oxide, 1,3-butylene oxide and tetrahydrofuran, amongst which ethylene oxide and 1,2-propylene oxide are preferred. The alkylene oxides may be used individually, alternately or as mixtures. Examples of suitable starter molecules are water, ammonia, amines, e.g. ethylenediamine, hexamethylenediamine, toluylenediamine, diaminodiphenylmethanes or hydrazine, aminoalcohols, e.g. monoethanolamine and diethanolamine, dicarboxylic acids, e.g. adipic acid, butyric acid and terephthalic acid, and, preferably, polyhydroxy compounds with 2 to 8, preferably 2, hydroxyl groups, e.g. glycerol, trimethylolpropane, pentaerythritol, sorbitol, sucrose and, more particularly, ethylene glycol, propylene glycol and diethylene glycol. The polyalkylene ethers, which may be linear, partially branched or branched, have hydroxyl numbers of from 900 to 5, preferably from 55 to 10, depending on the functionality and the molecular weight.

Unsaturated polyalkylene ethers are used for the purposes of the invention. Such unsaturated polyalkylene ethers can be manufactured, for example, by reacting a saturated hydroxyl-containing polyalkylene ether with an organic compound which contains both an ethylenically unsaturated double bond and a reactive group, e.g. a hydroxyl, alkoxy, carboxyl, carbalkoxy, epoxy or isocyanate group or a dicarboxylic acid anhydride radical. Examples of suitable organic compounds of the said type are ethylenically unsaturated carboxylic acids and their derivatives, e.g. acrylic acid and methacrylic acid; hydroxyalkyl esters, where alkyl is of 1 to 18 carbon atoms, of unsaturated carboxylic acids, e.g. hydroxypropyl acrylate, trimethylolpropane diacrylate, trimethylolpropane monomethacrylate, pentaerythritol diacrylate and dihydroxyethylaminoethyl methacrylate, which compounds may or may not be used as mixtures with diisocyanates and/or polyisocyanates or after partial reaction with diisocyanates and/or polyisocyanates; N-methylolacrylamide, N-butoxymethylmethacrylamide and maleic anhydride. Examples of diisocyanates and/or polyisocyanates are hexamethylene diisocyanate, isophorone diisocyanate, 4,4'-diphenylmethane diisocyanate, toluylene diisocyanates and polyphenylenepolymethylene polyisocyanates. Unsaturated polyalkylene ethers may also be obtained by using an organic compound which contains both ethylenic unsaturation and a hydroxyl, carboxyl or epoxy group, as a reactant, e.g. as a starter molecule or as an alkylene oxide, in the manufacture of the polyalkylene ether. Examples of such organic compounds are unsaturated carboxylic acids and carboxylic acid anhydrides, e.g. maleic acid and maleic anhydride, fumaric acid, crotonic acid, propenylsuccinic anhydride, halogenated maleic acid and halogenated maleic anhydride, unsaturated polyhydric alcohols, e.g. 2-butene-1,4-diol, glycerol allyl ether, trimethylolpropane allyl ether, pentaerythritol allyl ether, pentaerythritol vinyl ether, pentaerythritol diallyl ether and 1-butene-3,4-diol, and unsaturated epoxides, e.g. 1-vinylcylohexane 3,4-epoxide, butadiene monoepoxide, glycidyl vinyl ether (1-vinyloxy-2,3-epoxypropane), glycidyl methacrylate and allyl glycidyl ether (3-allyloxypropylene oxide). To manufacture the unsaturated polyakylene ethers, the above ethylenically unsaturated organic compounds are employed in such amounts that the end product contains from 0.1 to 6 moles, preferably from 0.1 to 3 moles and especially from 0.5 to 2 moles, of unsaturated units per mole of polyalkylene ether.

The ethylenically unsaturated units may be present in the polyalkylene ether either in random distribution or substantially in the form of terminal groups. The use of unsaturated polyalkylene ethers with substantially terminal ethylenically unsaturated units is preferred.

The saturated and unsaturated polyalkylene ethers can be manufactured by conventional processes as described, for example, in U.S. Pat. Nos. 3,050,511, 3,346,557, 3,275,606 and 3,280,077, which are incorporated herein by reference. The reaction is in general carried out at from 0° to 130° C., under pressure or, where appropriate, at atmospheric pressure. Acid catalysts, e.g. Lewis acids, or basic catalysts, e.g. alkali metal hydroxides or alcoholates, can be present. The reaction can also be carried out in the absence of catalysts, at from 50° to 200° C.

The other starting component for the manufacture of the polyalkylene ether copolymers consists of ethylenically unsaturated monomers. Examples of suitable monomers, which can be used individually or as mixtures, are dienes, e.g. butadiene, isoprene and 1,6-hexadiene; substituted and unsubstituted styrenes, e.g. styrene, α-methylstyrene, methylstyrene, butylstyrene and chlorostyrene; vinyl compounds, for example vinyl esters, e.g. vinyl acetate, vinyl propionate and vinyl butyrate; vinyl ethers, e.g. vinyl methyl ether, vinyl ethyl ether and vinyl butyl ether; vinyl ketones, e.g. vinyl methyl ketone and vinyl ethyl ketone; acrylic monomers and substituted acrylic monomers, e.g. acrylonitrile, acrylic acid, methacrylic acid, and acrylates and methacrylates in which the alcohol radical is of 1 to 18 carbon atoms, e.g. 2-hydroxyethyl acrylate, 2-hydroxyethyl methacrylate, methyl methacrylate, cyclohexyl methacrylate, butyl acrylate and 2-ethylhexyl acrylate; N,N-dimethylacrylamide; N-butylacrylamide; maleic acid and its derivatives, e.g. maleic anhydride and dialkyl maleates, where alkyl is of 1 to 18 carbon atoms, e.g. dimethyl maleate, and fumaric acid and dialkyl fumarates, where alkyl is of 1 to 18 carbon atoms. The use of ethylenically unsaturated monomers, e.g. vinyl-aromatics, especially styrene and methylstyrenes, of acrylate and methacrylate esters, especially methyl methacrylate and 2-ethylhexyl acrylate, and of vinyl esters, especially vinyl acetate, is preferred.

The amount of the ethylenically unsaturated monomers used in the free radical graft polymerization and/or copolymerization is in general from 99.5 to 70% by weight, preferably from 99 to 80% by weight, based on the total weight of the mixture of monomers and ethylenically unsaturated polyalkylene ethers.

The graft polymerization and/or copolymerization can be activated thermally or by irradiation. Preferably, however, catalysts which form free radicals are employed for the polymerization, their amounts being from 0.01 to 10% by weight, preferably from 0.05 to 3% by weight, based on the weight of the monomer. The types of free radical catalyst used are those conventionally employed for vinyl polymerization. Examples of suitable catalysts are peroxides, e.g. dibenzoyl peroxide, acetyl peroxide, benzoyl hydroperoxide, di-tert.-butyl peroxide, lauroyl peroxide, cumene hydroperoxide and di-α-cumyl peroxide, percarbonates, e.g. diisopropyl peroxydicarbonate, azo compounds, e.g. α,α'-azo-bis-iso-butyronitrile, α,α'-azo-2-methylbutyronitrile and dimethyl-α,α'-azoisobutyrate, and redox systems, e.g. dibenzoyl peroxide-benzoin, persulfates and perborates. Mixtures of catalysts can also be used.

The manner in which the catalyst is introduced into the reaction mixture is not a critical factor in deciding the course of the graft polymerization and/or copolymerization. For example, it is possible to dissolve a suitable catalyst in the monomer and add this solution to the heated unsaturated polyalkylene ether, or to add the catalyst to the polyalkylene ether, heat this mixture and then run in the monomer continuously or in portions. It is also possible to mix all three components, i.e. the monomer, the unsaturated polyalkylene ether and the catalyst, and heat the mixture, or to add the catalyst to the reaction mixture of monomer and unsaturated polyalkylene ether. The preferred method depends on the ratio of polyalkylene ether to monomer and on the reaction conditions.

Though the graft polymerization and/or copolymerization is preferably carried out in the absence of diluents or solvents, the presence of organic solvents, e.g. substituted or unsubstituted aromatics, carboxylic acid esters, alcohols, ketones, ethers, aliphatic or cycloaliphatic hydrocarbons and halohydrocarbons is not excluded. If graft polymers and/or copolymers of low molecular weights are being manufactured, it may be advisable to add molecular weight regulators, e.g. mercaptans.

The reaction temperature depends on the selected monomer and on the catalyst system used. It is, in general, from 50° C. to 180° C., preferably from 70° C. to 160° C., and results in reaction times of from 0.5 to 20 hours. The polymerization can however also be carried out at lower or higher temperatures, where necessary under pressure, for example at from 1 to 10 bars. The graft polymerization and/or copolymerization can be carried out batchwise or continuously. It is advantageous to carry out the reaction in an inert atmosphere, e.g. in the presence of nitrogen, and to ensure good mixing of the reactants, for example by stirring. Residual unconverted monomers can, where these are volatile, be removed under reduced pressure or by steam distillation.

The resulting graft polymer and/or copolymer mixtures which, as already explained, consist of unmodified ethylenically unsaturated polyalkylene ethers, of graft polymer and/or copolymer and of pure homopolymer, or of homopolymer and copolymer, of the polymerized unsaturated monomers, have average molecular weights of from 1,000 to 1,000,000 and are soluble, or at least swellable, in styrene. The graft polymers and copolymers have an ordered, comb-shaped structure; in the case of the graft polymers, the teeth predominantly consist of vinyl polymer and the backbone consists of the polyalkylene ethers, whilst in the case of the copolymers the teeth predominantly consist of the polyalkylene ethers and the backbone consists of the vinyl polymer. The products form sufficiently stable emulsions wit the unsaturated polyesters (a) and ethylenically unsaturated copolymerizable monomeric compounds (b) and can also be employed in mixtures with thermoplastic polyether-free polymers, which may or may not contain carboxyl groups, without such mixtures losing the advantages achieved.

The polyalkylene ether copolymers are incorporated in the curable, unsaturated polyester molding compositions in an amount of from 0.1 to 25% by weight, preferably from 10 to 20% by weight, based on the total weight of the components (a) and (b).

Examples of polyester resin constituents which fall into category (d) are thickeners, inhibitors, fillers, lubricants, reinforcing agents, inert solvents, polymerization accelerators, shrinkage-reducing additives and others.

Examples of thickeners which may be mentioned are alkaline earth metal oxides, e.g. calcium oxide, calcium hydroxide, magnesium hydroxide and, preferably, magnesium oxide, and mixtures of these oxides and hydroxides. The said compounds can also be partially replaced by zinc oxide.

The content of thickeners in the polyester molding compositions according to the invention is in general from 0.5 to 5, preferably from 1 to 3, percent by weight, based on the mixture of components (a) and (b).

The conventional inhibitors may be used, examples being hydroquinone, tert.-butyl-pyrocatechol, p-benzoquinone, chloranil, nitrobenzenes, e.g. m-dinitrobenzene, thiodiphenylamine and salts of N-nitroso-N-cyclohexylhydroxylamine, and mixtures of these. The molding compositions in general contain from 0.005 to 0.2, preferably from 0.01 to 0.1, percent by weight of the inhibitors, based on components (a) and (b).

In addition, conventional fillers, reinforcing agents and lubricants are in most cases added to the curable unsaturated polyester molding compositions of the invention, with or without inert solvents, polymerization accelerators and/or other auxiliaries conventionally employed in processing polyester molding compositions.

Examples of suitable fillers are conventional finely powdered or granular inorganic or organic fillers, e.g. chalk, kaolin, quartz powder, dolomite, barite, metal powders, cement, talc, kieselguhr, wood flour, sawdust, pigments and the like.

Suitable reinforcing agents are inorganic or organic fibers or sheet-like structures which may or may not be woven; such materials consist, for example, of glass, asbestos, cellulose and synthetic organic high polymers, e.g. polycarboxylic acid esters, polycarbonates and nylons. The filler and reinforcing agents may be employed in amounts of from 5 to 200 percent by weight, based on components (a) to (c).

Examples of suitable lubricants are zinc stearate, magnesium stearate, calcium stearate and polyalkylene ether waxes.

Inert solvents, which may or may not be present, include ketones, esters and hydrocarbons, in amounts of up to 100 percent by weight, based on component (a). Examples of shrinkage-reducing additives which may or may not be used in addition to component (c) are thermoplastic polymers, e.g. polystyrene, styrene copolymers, polyvinyl acetate, polyacrylates or polymethacrylates, in amounts of from 1 to about 30 percent by weight, based on components (a)+(b). Conventional polymerization accelerators, e.g. heavy metal salts, may also be present.

The curable, unsaturated polyester molding compositions according to the invention preferably contain from 20 to 75 parts by weight of one or more ethylenically unsaturated copolymerizable polyesters (a), from 15 to 75 parts by weight of one or more ethylenically unsaturated copolymerizable monomeric compounds (b) and from 0.1 to 25 parts by weight of a polyalkylene ether copolymer.

The polyester molding compositions according to the invention can be converted to moldings by, for example, using a press, and employing a pressure of from 0.4 to 15 N/mm$^2$ at from 18° to 180° C. For this purpose, initiators, e.g. peroxides or other organic compounds which form free radicals on being heated, are incorporated, in amounts of from 0.05 to 5% by weight, preferably from 0.1 to 3% by weight, based on the total weight of components (a) and (b), into the curable, unsaturated polyester molding composition. Examples of initiators which give free radicals are benzoyl peroxide, tert.-butyl peroctoate, tert.-butyl perbenzoate, cyclohexanone peroxide, di-tert.-butyl peroxide, azo compounds, e.g. azodiisobutyronitrile, and other organic compounds having a labile carbon-carbon bond. The initiators are added to the unsaturated polyester molding compositions according to the invention only just before preparing the prepreg or before curing (wet pressing of the thickener-free, filled resin system).

The polyester molding compositions according to the invention are important for industrial purposes, since they cure to give dimensionally accurate moldings which have good mechanical and chemical properties. The polyester molding compositions are used for the manufacture of moldings, especially in mechanical and automotive engineering, and for the manufacture of furniture, e.g. chairs or furniture parts.

In the Examples, parts and percentages are by weight.

UNSATURATED POLYESTER RESINS

EXAMPLE 1

An unsaturated polyester of maleic anhydride, 1,2-propylene glycol and dipropylene glycol, in the molar ratio of 1:0.78:0.33, having an acid number of 30 and containing 0.493 equivalent of polymerizable double bonds/100 g of unsaturated, copolymerizable polyester (a), was stabilized with 0.01% by weight of hydroquinone, based on the total weight of components (a) and (b), and was then dissolved in styrene, i.e. component (b), to give a 72% strength by weight solution.

EXAMPLE 2

An unsaturated polyester of maleic anhydride and 1,2-propylene glycol, having an acid number of 28 and containing 0.516 equivalent of copolymerizable double bonds per 100 g of unsaturated, copolymerizable polyester (a), wa stabilized with 0.01% by weight of hydroquinone, based on the total weight of components (a) and (b), and was then dissolved in styrene, i.e. component (b), to give a 65% strength by weight solution.

EXAMPLE 3

The unsaturated polyester resins from Examples 1 and 2 were mixed in the weight ratio of 1:1.

EXAMPLE 4

Preparation of solutions of polymer in styrene

Polyalkylene ether copolymer A

Manufacture of the polyalkylene ether copolymer 100 parts of a difunctional polyethylene glycol of molecular weight 9,000, 1 part of maleic anhydride and 1.1 parts of succinic anhydride are melted, whilst stirring, and are heated at 135° C. for one hour. The acid number of the resulting modified polyethylene glycol is 12.6.

60 g of the above modified polyethylene glycol are added, in the course of 50 minutes, to a mixture of 2,910 g of styrene and 30 g of α-methylstyrene, contained in a 4 liter stirred vessel, at 145° C. under nitrogen. The reaction mixture is then polymerized for a further 10 minutes at 145° C. The cloudy solution in styrene, obtained after cooling the mixture, has a solids content of 51% by weight; it is stabilized by adding 0.02% by weight of hydroquinone, based on total weight, and is brought to 40% strength by weight by adding styrene.

To ascertain whether the product is a copolymer or a mixture of polystyrene and modified polyethylene glycol, the polymer was twice taken up in tetrahydrofuran and precipitated by dripping the solution into petroleum ether of boiling range 65°–95° C. The precipitated polymer was dried, pulverized and extracted for 10 hours with distilled water at 50° C. Elementary analysis of the polymer before and after precipitation indicates that the material is a styrene copolymer which contains about 4% by weight, based on the total weight, of chemically bonded polyethylene glycol segments.

| Elementary analysis: | C (%) | H (%) | O (%) |
|---|---|---|---|
| calculated (complete copolymerization): | 91.2 | 7.8 | 1.6 |
| found before extraction: | 89.7 | 7.9 | 1.7 |
| found after extraction: | 90.3 | 7.8 | 1.5 |

POLYMER SOLUTION B
(Comparative Example)

A mixture of 2,970 g of styrene and 30 g of α-methylstyrene contained in a 4 liter stirred vessel is polymerized for one hour at 145° C. under nitrogen. The clear solution in styrene, obtained after cooling, has a solids content of 52% by weight, based on total weight; it is brought to 40% strength by weight by adding styrene, and is stabilized with 0.02% by weight of hydroquinone, based on total weight. The intrinsic viscosity of the polymer in toluene is 11,800.

POLYMER SOLUTION C
(Comparative Example)

150 g of toluene and 100 g of methyl methacrylate are refluxed, whilst passing nitrogen through the mixture, in a 2 liter reaction vessel equipped with a stirrer and reflux condenser. A solution of 2 g of dibenzoyl peroxide (75% strength by weight in water) in 100 g of toluene is dripped uniformly, in the course of 2.5 hours, into the reaction solution, after which 400 g of methyl methacrylate are added dropwise in the course of 2 hours. The reaction mixture is polymerized for a further 2 hours, 2.5 of dibenzoyl peroxide are added, and the polymerization is completed in the course of 2 hours. The clear solutio obtained by dilution with 500 g of toluene to a solids content of 40% by weight has a K value (measured on a 1% strength solution in tetrahydrofuran, by the method of H. Fikentscher, Cellulose-Chemie 13, (1932), 58) of 42. To prepare a solution in styrene, the product is degassed for 10 hours under reduced pressure and a 30% strength by weight solution in styrene is then prepared, with the addition of 0.02% by weight of hydroquinone, based on total weight.

POLYAKYLENE ETHER COPOLYMER D

If the procedure for polymer solution C is followed, but starting with a mixture of 150 g of toluene, 80 g of methyl methacrylate and 20 g of modified, macromeric polyethylene glycol described in connection with the polyalkylene ether copolymer A, a copolymer which is sparingly soluble in toluene and has a K value of 41.5 (measured on a 1% strength solution in tetrahydrofuran) is obtained. The product is degassed and converted to a 30% strength by weight solution in styrene.

POLYMER SOLUTION E
(Comparative Example)

A mixture of 150 g of toluene, 40 g of methyl methacrylate and 10 g of vinyl acetate is refluxed in a 2 liter reaction vessel equipped with a stirrer and reflux condenser. A mixture of 360 g of methyl methacrylate and 90 g of vinyl acetate is dripped into the reaction mixture in the course of 2 hours, after which 2 g of dibenzoyl peroxide (75% strength by weight in water) dissolved in 64 g of toluene are added dropwise in the course of 2.5 hours. After said addition, the polymerization is completed in the course of 6 hours, 3.5 g of dibenzoyl peroxide being additionally added. The solution is dried for 10 hours at 150° C. under reduced pressure. The polymer, which has a K value of 40.6 (measured on a 1% strength solution in tetrahydrofuran) is used to prepare a 30% strength by weight solution in styrene.

POLYALKYLENE ETHER COPOLYMER F

If the procedure for polymer solution E is followed, but starting from a mixture of 150 g of toluene, 20 g of methyl methacrylate, 10 g of vinyl acetate and 20 g of the modified macromeric polyethylene glycol prepared as described in connection with polyalkylene ether copolymer A, a copolymer having a K value of 43.7 (measured on a 1% strength solution in tetrahydrofuran) is obtained. The product is degassed and converted to a 30% strength by weight solution in styrene.

POLYALKYLENE ETHER COPOLYMER G

A mixture of 50 g of toluene, 80 g of styrene, 80 g of 2-ethylhexyl acrylate, 40 g of the modified polyethylene glycol prepared as described in connection with polyalkylene ether copolymer A, and 1 g of dibenzoyl peroxide (75% strength by weight in water) is polymerized for one hour under reflux in a 1 liter reaction vessel equipped with a stirrer and reflux condenser. A solution of 58 g of toluene and 2 g of dibenzoyl peroxide (75% strength by weight in water) is then added dropwise to the reaction mixture in the course of 3 hours. The mixture is again polymerized for 3 hours under reflux, a further 2 g of dibenzoyl peroxide (75% strength by weight in water) are added to the reaction mixture and the polymerization is completed in 2 hours. The toluene is distilled, under reduced pressure, from the reaction mixture, which has a solids content of 64% by weight, based on total weight, 1 g of formic acid is then added and the melt is stirred for 1 hour at 130° C. A 40% strength by weight solution of the polymer mixture in styrene is prepared and is stabilized by adding 0.02% by weight of hydroquinone, based on total weight.

POLYMER SOLUTION H

A 40% strength by weight solution of a commercial polymethyl methacrylate (®Plexiglas 6 N, from Böhm GmbH, Darmstadt) in styrene is prepared.

POLYALKYLENE ETHER COPOLYMER I

A mixture of 485 g of styrene, 10 g of a modified polyethylene ether, obtained by azeotropically esterifying a difunctional polyethylene glycol having a molecular weight of 9,000 with acrylic acid in toluene until the hydroxyl number is less than 1, and distilling off the volatile constituents, and 5 g of α-methylstyrene, is polymerized for one hour at 140° C., whilst being flushed with nitrogen, in a 2 liter reaction vessel equipped with a stirrer and reflux condenser.

The solution in styrene, which has a solids content of 54.4% by weight, based on total weight, is brought to 40% strength by weight, by adding styrene, and is stabilized by adding 0.02% by weight of hydroquinone, based on total weight.

POLYALKYLENE ETHER COPOLYMER K

If the procedure described for the preparation of polymer solution I is followed, but instead of the polyethylene ether described there a monoolefinically unsaturated ethylene oxide polymer, having a molecular weight of 8,000 and prepared by anionic polymerization of ethylene oxide and stopping the reaction with methyl methacrylate, is used, a solution of polymer in styrene, having a solids content of 50% by weight, based on total weight, is obtained. The solution is stabilized, and brought to 40% strength by weight, as described for polymer solution I.

POLYMER SOLUTION L (Comparative Example)

The procedure described for polymer solution I is followed, but instead of the modified polyethylene ether a difunctional saturated polyethylene glycol having a molecular weight of 9,000 is used. This gives a cloudy solution in styrene, having a solids content of 52% by weight, based on total weight.

EXAMPLE 5

(a) To test a prepreg having low shrinkage, a glass mat is impregnated with the reaction mixture shown below and stored for 6 days at 23° C. between polyethylene films, in order to ripen. The reaction mixture comprises: 60 parts of unsaturated polyester resin, prepared as described in Example 2, 40 parts of polyalkylene ether copolymer A, 60 parts of chalk filler (Hydrocarb, from OMYA GmbH, Cologne), 90 parts of chalk filler (Omga BLR 2 from OMYA GmbH, Cologne), 3 parts of calcium stearate, 3 parts of chrome green, 3 parts of tert.-butyl perbenzoate (50% strength by weight in plasticizer) and 1.5 parts of magnesium oxide.

After removing the covering films, the mat was pressed in a polished steel mold for 5 minutes at 145° C. under 7.45 N/mm², and the plate-shaped molding, which contained about 30% by weight of glass, based on total weight, was released from the mold. The molding had a homogeneous and glossy surface. No detectable deposit was left on the mold.

(b) If the procedure described under (a) is used, but instead of the polyalkylene ether copolymer A the polymer solution B is employed, a molding which has an inhomogeneous blotchy surface, with only little gloss, is obtained.

EXAMPLE 6

To determine the stability of the emulsions, mixtures of 60 parts of the unsaturated polyester resin obtained as described in Example 3 and 40 parts of the polyalkylene ether copolymer A, D, F, I or K or of the polymer solutions B, C, E or L, were prepared and observed for 24 hours in a test tube to see whether there were signs of phase separation. The results, listed in the Table which follows, show that the polyester molding compositions which contained polyalkylene ether copolymers are emulsions which are stable over the period of observation, whilst the polyester molding compositions containing polymer solution rapidly underwent phase separation and settled out in 2 layers.

| Polymer | Stability after 24 hours' storage at 25° C. |
| --- | --- |
| polyalkylene ether copolymer A | stable |
| polymer solution B | phases separate |
| polymer solution C | phases separate |
| polyalkylene ether copolymer D | stable |
| polymer solution E | phases separate |
| polyalkylene ether copolymer F | stable |
| polyalkylene ether copolymer I | stable |
| polyalkylene ether copolymer K | stable |
| polymer solution L | phases separate |

EXAMPLE 7

To determine the stability of the emulsions, 27 parts of unsaturated polyester resin prepared as described in Example 3, 15 parts of polymer solution H and 3 parts of polyalkylene ether copolymer G were mixed and stored in a sealed test tube. The emulsion proved stable over a period of observation of 20 days at room temperature.

In a Comparative Experiment, 60 parts of unsaturated polyester resin prepared as described in Example 3 and 40 parts of polymer solution H were mixed and stored in a sealed test tube at room temperature. The phase separation was complete after only 24 hours.

We claim:

1. An unsaturated polyester molding composition which is curable in the presence of a polymerization initiator and comprises a mixture of
   (a) one or more ethylenically unsaturated copolymerizable polyesters,
   (b) one or more ethylenically unsaturated copolymerizable monomeric compounds, the proportion by weight of a:b being 80:20 to 30:70, and
   (c) a polyalkylene ether copolymer in an amount of 0.1 to 25% by weight, based on the total weight of components a and b, wherein the polyalkylene ether copolymer has a molecular weight of between about 1,000 and 1,000,000 and is a graft polymer mixture or copolymer mixture, or a mixture of these, which graft polymer mixture or copolymer mixture is obtained by free radical polymerization of ethylenically unsaturated polyalkylene ethers and one or more ethylenically unsaturated monomers in a proportion by weight of ethers:monomers of 0.5:99.5 to 30:70.

2. A curable unsaturated polyester molding composition as claimed in claim 1, wherein the polyalkylene ether copolymer is a graft polymer mixture which is obtained by free radical graft polymerization of an ethylenically unsaturated hydroxyl-containing polyalkylene ether and one or more ethylenically unsaturated monomers.

3. A curable unsaturated polyester molding composition as claimed in claim 1, wherein the polyalkylene ether copolymer is a copolymer mixture which is obtained by free radical copolymerization of an ethylenically unsaturated, copolymerizable polyalkylene ether and one or more ethylenically unsaturated monomers.

4. A curable unsaturated polyester molding composition as claimed in claim 3, wherein the ethylenically unsaturated copolymerizable polyalkylene ether contains from 0.1 to 6 moles of ethylenically unsaturated groups per mole of polyalkylene ether.

5. A curable unsaturated polyester molding composition as claimed in claim 4, wherein the ethylenically unsaturated copolymerizable polyalkylene ether contains the ethylenically unsaturated groups predominantly in the terminal positions.

6. A curable unsaturated polyester molding composition as claimed in claim 1, wherein the graft-polymerizable or copolymerizable ethylenically unsaturated polyalkylene ether has been obtained using a polyfunctional starter molecule, which may or may not be ethylenically unsaturated and has from 2 to 6 hydrogen atoms which are active in a Zerewitinoff reaction, and one or more alkylene oxides of 2 to 4 carbon atoms per alkylene unit.

7. A curable unsaturated polyester molding composition as claimed in claim 1, wherein the ethylenically unsaturated copolymerizable polyalkylene ethers are prepared by reacting a saturated hydroxyl-containing polyalkylene ether with an organic compound containing an ethylenically unsaturated double bond and a reactive group selected from the group consisting of hydroxyl, alkoxy, carboxyl, carbalkoxy, epoxy, isocyanate group and dicarboxylic acid anhydride radical.

8. A curable unsaturated polyester molding composition as claimed in claim 1, wherein the saturated hydroxyl-containing polyalkylene ether consists of polymerized units of ethylene oxide or ethylene oxide and propylene oxide.

9. A curable unsaturated polyester molding composition as claimed in claim 1, wherein the ethylenically unsaturated copolymerizable polyalkylene ethers have molecular weights of from 2,000 to 10,000.

10. A curable unsaturated polyester molding composition as claimed in claim 1, wherein the ethylenically unsaturated copolymerizable polyalkylene ether contains from 0.1 to 6 moles of ethylenically unsaturated groups per mole of polyalkylene ether.

11. A curable unsaturated polyester molding composition as claimed in claim 1, wherein the ethylenically unsaturated copolymerizable polyalkylene ether contains from 0.1 to 3 moles of ethylenically unsaturated groups per mole of polyalkylene ether.

12. A curable unsaturated polyester molding composition as claimed in claim 4, wherein the ethylenically unsaturated copolymerizable polyalkylene ether contains the ethylenically unsaturated groups predominantly in the terminal positions.

13. A curable unsaturated polyester molding composition as claimed in claim 1, wherein the polyalkylene ether copolymers are prepared by copolymerizing ethylenically unsaturated polyalkylene ethers and styrene or methylstyrenes.

14. A curable unsaturated polyester molding composition as claimed in claim 1, wherein the polyalkylene ether copolymers are prepared by copolymerizing ethylenically unsaturated polyalkylene ether and methyl methacrylate.

15. A curable unsaturated polyester molding composition as claimed in claim 1, wherein the polyalkylene ether copolymers are prepared by copolymerizing ethylenically unsaturated polyalkylene ethers and methylmethacrylate and vinylacetate.

16. A curable unsaturated polyester molding composition as claimed in claim 1, wherein the ethylenically unsaturated copolymerizable polyesters contain radicals of ethylenically unsaturated dicarboxylic acids in an amount of from 50 to 100 mole percent based on dicarboxylic acids present.

* * * * *